United States Patent
Zhang et al.

(10) Patent No.: US 11,829,624 B2
(45) Date of Patent: Nov. 28, 2023

(54) METHOD, DEVICE, AND COMPUTER READABLE MEDIUM FOR DATA DEDUPLICATION

(71) Applicant: EMC IP Holding Company LLC, Hopkinton, MA (US)

(72) Inventors: Ming Zhang, Beijing (CN); Shuo Lv, Beijing (CN); Chen Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/843,004

(22) Filed: Apr. 8, 2020

(65) Prior Publication Data

US 2020/0341670 A1    Oct. 29, 2020

(30) Foreign Application Priority Data

Apr. 29, 2019 (CN) .......................... 201910355283.4

(51) Int. Cl.
 G06F 3/00 (2006.01)
 G06F 3/06 (2006.01)
(52) U.S. Cl.
 CPC ............ G06F 3/0641 (2013.01); G06F 3/067 (2013.01); G06F 3/0608 (2013.01); G06F 3/0631 (2013.01); G06F 3/0656 (2013.01); G06F 3/0665 (2013.01)
(58) Field of Classification Search
 CPC ...... G06F 3/0641; G06F 3/0608; G06F 3/063; G06F 3/0656; G06F 3/0665; G06F 3/067
 See application file for complete search history.

(56) References Cited

U.S. PATENT DOCUMENTS

| | | | |
|---|---|---|---|
| 8,555,053 B1 * | 10/2013 | Vitalo | G06F 13/382 |
| | | | 713/153 |
| 10,585,604 B2 | 3/2020 | Bassov | |
| 10,614,036 B1 | 4/2020 | Usvyatsky et al. | |
| 10,614,038 B1 | 4/2020 | Armangau et al. | |
| 10,635,315 B1 | 4/2020 | Armangau et al. | |
| 10,678,435 B2 | 6/2020 | Swift | |
| 2003/0018878 A1 * | 1/2003 | Dorward | G06F 16/137 |
| | | | 711/216 |
| 2012/0066443 A1 * | 3/2012 | Li | G06F 12/0246 |
| | | | 711/E12.008 |
| 2012/0137054 A1 * | 5/2012 | Sadri | G06F 3/0608 |
| | | | 711/E12.008 |

(Continued)

*Primary Examiner* — Craig S Goldschmidt
(74) *Attorney, Agent, or Firm* — BainwoodHuang (57) ABSTRACT

Techniques provide for data deduplication. Such techniques involve: allocating a storage area in a storage device, the storage area including a first storage segment for storing an incompressible data block and a second storage segment for storing a compressed data block, a first size of the first storage segment being greater than a second size of the second storage segment; in response to receiving a write request, determining whether data block to which the write request is related is compressible; in response to determining that the data block is incompressible, adding header information to the data block to generate a first data segment of the first size; and storing the first data segment in the first storage segment through a deduplication operation. Accordingly, such techniques can increase the flexibility and efficiency of data deduplication.

11 Claims, 9 Drawing Sheets

(56) References Cited

U.S. PATENT DOCUMENTS

2014/0188819 A1\* 7/2014 Bagal ................. G06F 16/2365
707/692
2018/0088807 A1 3/2018 Zhao et al.
2018/0300252 A1 10/2018 Han et al.

\* cited by examiner

METHOD, DEVICE, AND COMPUTER READABLE MEDIUM FOR DATA DEDUPLICATION

CROSS REFERENCE TO RELATED APPLICATION

This application claims priority to Chinese Patent Application No. CN201910355283.4, on file at the China National Intellectual Property Administration (CNIPA), having a filing date of Apr. 29, 2019, and having "METHOD, DEVICE, AND COMPUTER READABLE MEDIUM FOR DATA DEDUPLICATION" as a title, the contents and teachings of which are herein incorporated by reference in their entirety.

FIELD

Embodiments of the present disclosure generally relate to the field of data storage, and more specifically, to a method, device and computer readable medium for data deduplication.

BACKGROUND

Currently, various virtualization technologies are commonly used in data storage to provide data redundancy, in order to increase security. However, a disadvantage of this approach is that a large amount of redundant data is often stored in the backup device. Data deduplication technology has been proposed to reduce storage capacity used in storage systems. The data deduplication technology is based on a mapping of logical blocks corresponding to the data to be stored to physical storage space. In response to determining that the data to be stored has been stored in the physical storage space, the data deduplication operation only maps the logical blocks of the data to the physical storage space; in the opposite case, the data deduplication operation stores the data in the physical storage space. However, the conventional data deduplication operation should be performed after compressing the data, so as to store the compressed data in a storage space dedicated to the compressed data. For incompressible data, the storage operation is performed directly without data deduplication. This is undesired for situations where the data needs to be duplicated but incompressible. Therefore, there is a need for an improved scheme wherein the data deduplication is available for incompressible data, thereby significantly increasing the flexibility and efficiency of data deduplication.

SUMMARY

Embodiments of the present disclosure provide an improved scheme for data deduplication.

In accordance with a first aspect of the disclosure, it provides a method for data deduplication. The method including: allocating a storage area in a storage device, the storage area including a first storage segment for storing an incompressible data block and a second storage segment for storing a compressed data block, a first size of the first storage segment being greater than a second size of the second storage segment; in response to receiving a write request, determining whether the data block to which the write request is related is compressible; in response to determining that the data block is incompressible, adding header information to the data block to generate a first data segment of the first size; and storing the first data segment in the first storage segment through a deduplication operation.

In accordance with a second aspect of the disclosure, it provides an electronic device. The device including: one or more processors; and a storage device for storing one or more programs, the one or more programs, when executed by the one or more processors, causing the one or more processors to perform acts including: allocating a storage area in a storage device, the storage area including a first storage segment for storing an incompressible data block and a second storage segment for storing a compressed data block, a first size of the first storage segment being greater than a second size of the second storage segment; in response to receiving a write request, determining whether the data block to which the write request is related is compressible; in response to determining that the data block is incompressible, adding header information to the data block to generate a first data segment of the first size; and storing the first data segment in the first storage segment through a deduplication operation.

In accordance with a third aspect of the disclosure, it provides a computer readable medium. The computer readable medium having computer readable instructions stored thereon, the computer readable instructions, when executed, cause a device to perform the method of the first aspect.

The Summary of the invention is provided to introduce a selection of concepts in a simplified form, which are further described in the Detailed Description. The Summary is not intended to identify key features or essential features, nor limit the scope of the present disclosure.

BRIEF DESCRIPTION OF THE DRAWINGS

Through the following Detailed Description with reference to the accompanying drawings, the above and other objectives, features, and advantages of example embodiments of the present disclosure will become more apparent. In the example embodiments of the present disclosure, the same reference numerals generally denote the same components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of example embodiments disclosed herein will now be described with reference to the drawings. Although preferred embodiments of the present disclosure are shown in the drawings, it should be appreciated, however, that the present disclosure may be implemented in various forms without being limited to the embodiments set forth herein. On the contrary, providing those embodiments is merely to enable the present disclosure be more thorough and complete and to fully convey the scope of the present disclosure to those skilled in the art.

As used herein, the term "comprising" and its variants are to be read as open terms that mean "comprises, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The terms "first", "second" and the like may refer to different or identical objects. Other explicit and implicit definitions may also be included below.

As discussed above, embodiments of the present disclosure provide an improved scheme wherein deduplication operation is available for incompressible data. Data storage involves a large number of incompressible files or data, such as image files, installation package files, video streams, and the like. In the conventional data deduplication scheme, data deduplication operation is not performed on these incompressible files or data; instead, these files or data are directly stored in the storage device, thereby causing waste of the storage area of the storage device. In order to solve the above problems, the present disclosure proposes an improved method, device, and computer storage medium for data deduplication by allocating a storage area in a storage device, wherein the storage area includes a first storage segment for storing an incompressible data block and the second storage segment for storing a compressed data block. As a result, data deduplication operation can be performed for both compressible data and incompressible data and thereby increase the flexibility and efficiency of data deduplication.

Figure 1:
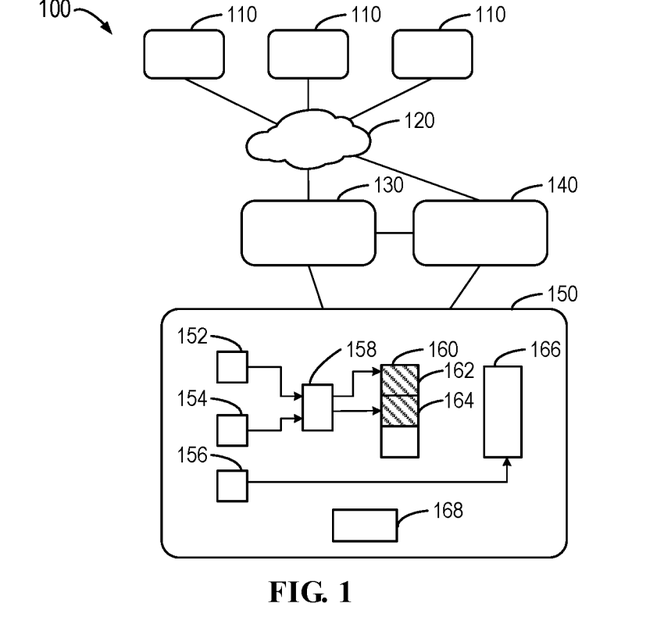
FIG. 1 shows a schematic diagram of a conventional system for data deduplication.

FIG. 1 is a schematic diagram illustrating a conventional system 100 for data deduplication. The system 100 includes a plurality of clients 110, a network 120, a cache 130, a processor 140, and a storage device 150.

The client 110 reads data from or writes data to the storage device 150 via the network 120. In some implementations, the client 110 issues a read request or a write request to the processor 140 via the network 120, and the processor 140 reads and writes data in storage device 150 in response to the read request and/or write request. The clients 110 include, but are not limited to, mobile phones, desktop computers, laptop computers, tablets, smart watches, and human-computer interaction terminals of other forms. The network 120 includes forms of wired and/or wireless.

In the following, a system and an operation for data duplication will be described based on the case where the client 110 writes data to the storage device 150, e.g., the client 110 issues a write request to the processor 140.

When the processor 140 receives a write request from the client 110, the data to be written involved in the write request will be firstly stored in the cache 130 connected to the network 120. The cache 130 is used for temporarily storing data to be written, and preprocessing the data to be written. In some implementations, pre-processing includes compressing the data to be written to determine if the data to be written is compressible. In some implementations, the data to be written includes a plurality of data blocks and each data block is in a fixed size. In some implementations, each compressed data block is added with header information to generate a data segment for deduplication operation. The data to be written preprocessed by the cache 130 is further stored in the storage device 150 by the processor 140.

The processor 140 is coupled to the cache 130 and the storage device 150, and the processor 140 is configured to perform conventional data deduplication operation. In some implementations, the processor 140 builds a mapping of logical blocks (to be described below) to storage area in the storage device 150 in response to receiving a write request. In some implementations, processor 140 creates logical blocks 152, 154, and 156 which correspond to different data blocks in the storage device 150. In some implementations, processor 140 maps different logical blocks to different storage areas 160 and 166 in storage device 150 via a mapper 158 based on whether the data to be written determined in the cache 130 is compressible. In some implementations, the processor 140 also updates the metadata 168 in the storage device 150.

The storage device 150 includes a plurality of dynamically allocated storage areas for storing write data. Two storage areas 160 and 166 are shown in FIG. 1, wherein storage area 160 is used to store compressible data blocks and storage area 166 is used to store incompressible data blocks. The storage area 160 includes a plurality of storage segments which are illustrated as storage segments 162 and 164 in FIG. 1. Since each storage segment has a maximum size equal to the fixed size of the data blocks involved in a single deduplication operation, the size of each storage segment allows only the compressed data blocks, instead of the incompressible data blocks, to be stored. Other storage areas in the storage device 150 are not shown in FIG. 1.

The storage device 150 also stores mapping of logical blocks 152 and 154 to the storage area 160. The logic blocks 152 and 154 are logical blocks corresponding to the compressible data blocks determined by the processor 140, and are therefore mapped to storage area 160 via the mapper 158. Mapper 158 is used to establish mapping of the logic blocks 152 and 154 to the storage area 160, and specifically includes pointers to two storage segments 162 and 164 in the storage area 160 respectively. The pointers point to storage segments 162 and 164 storing compressed data blocks (including header information) corresponding to the logic blocks 152 and 154 respectively. The mapping relationship of logic block-mapper-storage areas is used to implement data deduplication of compressible data blocks.

In FIG. 1, the logic block 156 is a logical block corresponding to an incompressible data block determined by processor 140, and it is not mapped to the storage area 160 via the mapper 158 but directly to the storage area 166. Thus, the contents of the incompressible data block (including the header information) are directly stored in the storage area 160 and are not involved in the data deduplication operation.

The storage device 150 also stores metadata 168 that includes a set of feature values for data deduplication (not shown in FIG. 1). The set of feature values includes different feature values respectively corresponding to different compressed data blocks, each feature value being used to identify the uniqueness of the corresponding compressed data block. In the data deduplication operation of FIG. 1, when it is determined that the feature value is absent from the set of feature values, the compressed data block corresponding to the feature value is stored in an available storage segment in the storage area 160, and the mapping relationship is then updated. Otherwise, only the mapping relationship is updated, so as to indicate that the compressed data block corresponding to the feature value has been stored in the storage area 160. Thereby, the deduplication operation of the compressed data block is achieved. In some implementations, the metadata 168 also includes other data, such as transaction logs and the like.

Thus, based on the system 100 of FIG. 1, the processor 140 is only capable of performing data deduplication operation on the compressed data block rather than the incompressible data block. When the processor 140 determines that the data block is incompressible, the data block is only directly stored in the storage area 166 of the storage device 150 without a deduplication operation. A large number of incompressible data blocks may result in significant occupancy in the storage area, and thus significantly affect the efficiency of data deduplication.

Embodiments of the present disclosure propose an improved method for data deduplication. The improved method separately sets a first storage segment for storing incompressible data blocks and a second storage segment for storing compressed data blocks in a storage area, and separately stores the incompressible data blocks and compressed data blocks through a deduplication operation. This improved method implements data deduplication for both compressible data and incompressible data, thereby increasing the flexibility and efficiency of data deduplication.

Figure 2:
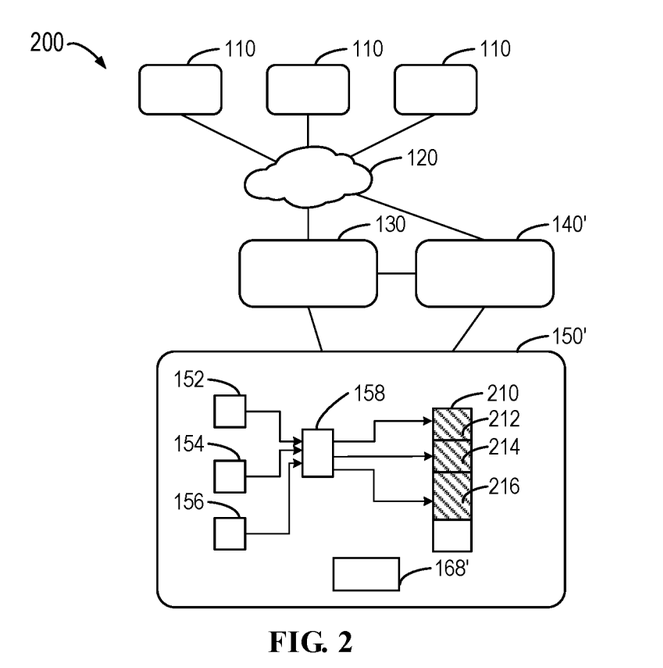
FIG. 2 shows a schematic diagram of a system in which embodiments of the present disclosure may be implemented.

FIG. 2 is a schematic diagram of a system 200 in which embodiments of the present disclosure may be implemented. The system 200 of FIG. 2 differs from the system 100 of FIG. 1 in that, in system 200, storage device 150' includes a plurality of dynamically allocated storage areas, but each storage area includes a first storage segment for storing incompressible data blocks and a second storage segment for storing compressed data blocks. One such storage area 210 is shown in FIG. 2, which includes a first storage segment 216 and second storage segments 212 and 214. In some embodiments, the first storage segment 216 has a first size that is greater than a second size of the second storage segments 212 and 214, so as to allow incompressible data blocks to be stored in the first storage segment 216.

Further, in the system 200, when a data block corresponding to the logic block 156 is determined to be incompressible by processor 140', the logic block 156 is mapped via the mapper 158 to a storage area allocated in the storage device 150'. This storage area is shown as storage area 210 in FIG. 2. Further, the metadata 168' stored in the storage device 150' includes a set of feature values for data deduplication. The set of feature values includes different feature values respectively corresponding to different data blocks, such that the set of feature values includes both different feature values corresponding to the compressed data block and different feature values corresponding to the incompressible data block.

Thus, based on the system 200 in FIG. 2, the processor 140' is capable of performing data deduplication operation on both compressed data blocks and incompressible data blocks. The data deduplication operation is similar to the data deduplication operation with reference to FIG. 1 above, and a detailed description is omitted here. When the processor 140' determines that the data block is incompressible, the logical block 156 corresponding to the data block is mapped to the first memory segment 216 in the storage area 210 via the mapper 158 through a deduplication operation. When the processor 140' determines that the data block is compressible, the logical blocks 152 and 154 corresponding to the data block are mapped to the second storage segments 212 and 214 in the storage area 210 via the mapper 158 through a deduplication operation. The storage area 210 allocated in the storage device 150' includes first storage segment and second storage segment in different sizes. Thus, it is possible to construct data blocks with different compression ratios in a mapping relationship, and to implement the deduplication operation to the data block with different compression ratios.

For the sake of simplicity, the number of logical blocks, mappers, and storage areas in the storage device 150' is by way of example only. In the actual situation, there are many more logical blocks, mappers, and storage areas than those shown in FIG. 2.

Additionally, in some embodiments, each storage area has a plurality of first storage segments and a plurality of second storage segments. In some embodiments, the different second storage segments have different second sizes for storing data blocks with different compression ratios.

Figure 3:
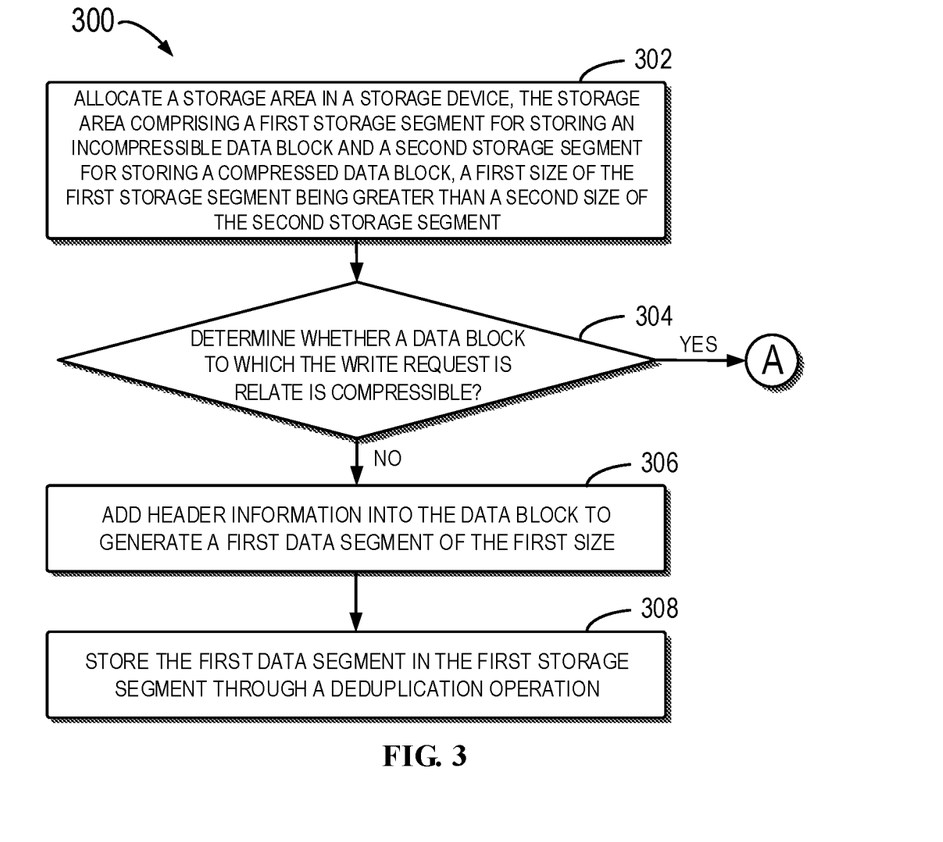
FIG. 3 shows a flow chart of a method for data deduplication in accordance with an embodiment of the present disclosure.

Embodiments of the present disclosure will be further described below with reference to flow charts. FIG. 3 shows a flow chart of a method 300 for data deduplication in accordance with an embodiment of the present disclosure. The method 300 can be performed by the processor 140' in FIG. 2.

Referring to FIG. 3, at block 302, the processor 140' allocates a storage area in the storage device, the storage area including a first storage segment for storing incompressible data blocks and a second storage segment for storing compressed data blocks. The first storage segment has a first size greater than a second size of the second storage segment.

As mentioned above, each data block has a fixed size. As an example, each data block has a size of 8 KB. When the data block is determined to be incompressible, the data block to which the header information is added (hereinafter referred to as "data segment") has a size larger than 8 KB. In the conventional system 100 shown in FIG. 1, since each storage segment has a maximum size of 8 KB, data segments generated based on incompressible data blocks cannot be stored in the storage segment. In an embodiment of the present disclosure, a first storage segment for storing an incompressible data block is specifically allocated in the storage area. In the case of this example, the first storage segment has a first size greater than 8 KB and the second storage segment has a second size smaller than the first size. Thereby, the first storage segment and the second storage segment with different sizes are allocated in the storage area. As a result, the data blocks with different compression ratios are stored in the storage device through the deduplication operation, thereby improving the flexibility and efficiency of data deduplication.

At block 304, in response to receiving the write request, it is determined whether the data block to which the write request is related is compressible. In some embodiments, each data block is individually determined whether it is compressible for a plurality of data blocks comprised in a data file to which a write request is related. The purpose of determining whether a data block is compressible is to determine whether the data block should be stored in the first storage segment or in the second storage segment.

Figure 4:
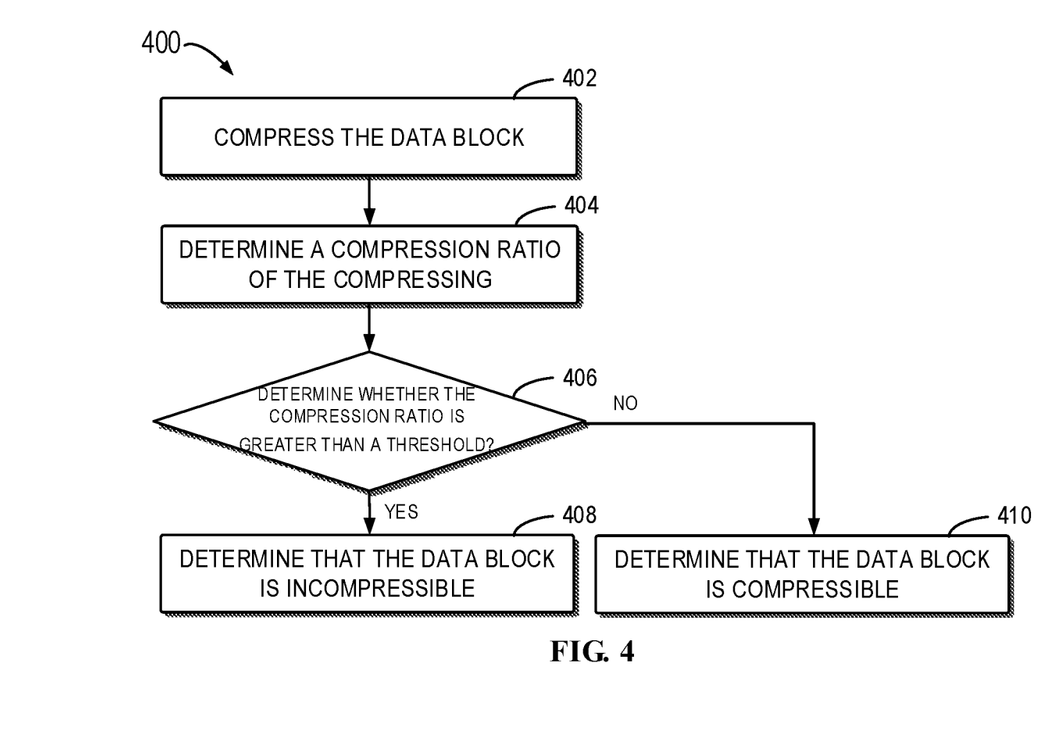
FIG. 4 shows a flow chart of a method of determining whether a data block is compressible in accordance with an embodiment of the present disclosure.

Turning to FIG. 4, FIG. 4 shows a flow chart of a method 400 of determining whether a data block is compressible in accordance with an embodiment of the present disclosure. The method 400 is one embodiment of the operations at block 304.

The method 400 begins at block 402, in which a data block is compressed. In some embodiments, the data block is compressed by the processor 140' in the cache 130 of FIG. 2. In some embodiments, compression of the data block employs existing lossy compression algorithms and lossless compression algorithms, such as Huffman coding, dictionary methods, Columbus index coding, arithmetic coding, run length coding (RLE), and the like.

At block 404, a compression ratio of the compression is determined. In some embodiments, the compression ratio is defined as the ratio of the size before compression to that after compression of the compressed data block. Subsequently, at block 406, it is determined whether the compression rate is greater than a threshold.

In the event that that the compression rate is greater than the threshold at block 406, the method 400 proceeds to block 408 where it is determined that the data block is incompressible. In the event that the compression rate is determined not greater than the threshold at block 406, the method 400 proceeds to block 410 where it is determined that the data block is compressible.

Returning to FIG. 3, in the case that it is determined at block 304 that the data block is incompressible, the method 300 proceeds to block 306, where the processor 140' adds header information to the data block to generate a first data segment of a first size. A first data segment is generated for subsequent storage in the first storage segment available through the deduplication operation. In some embodiments, the header information is the metadata for identifying the length of the data block, the storage location, the uniqueness of the data, and the like. In some embodiments, a feature value for identifying the first data segment can be generated based on the header information of the first data segment.

Subsequently, at block 308, the first data segment is stored in the first storage segment through a deduplication operation. Thereby, the deduplication operation on the incompressible data block is achieved.

Figure 5:
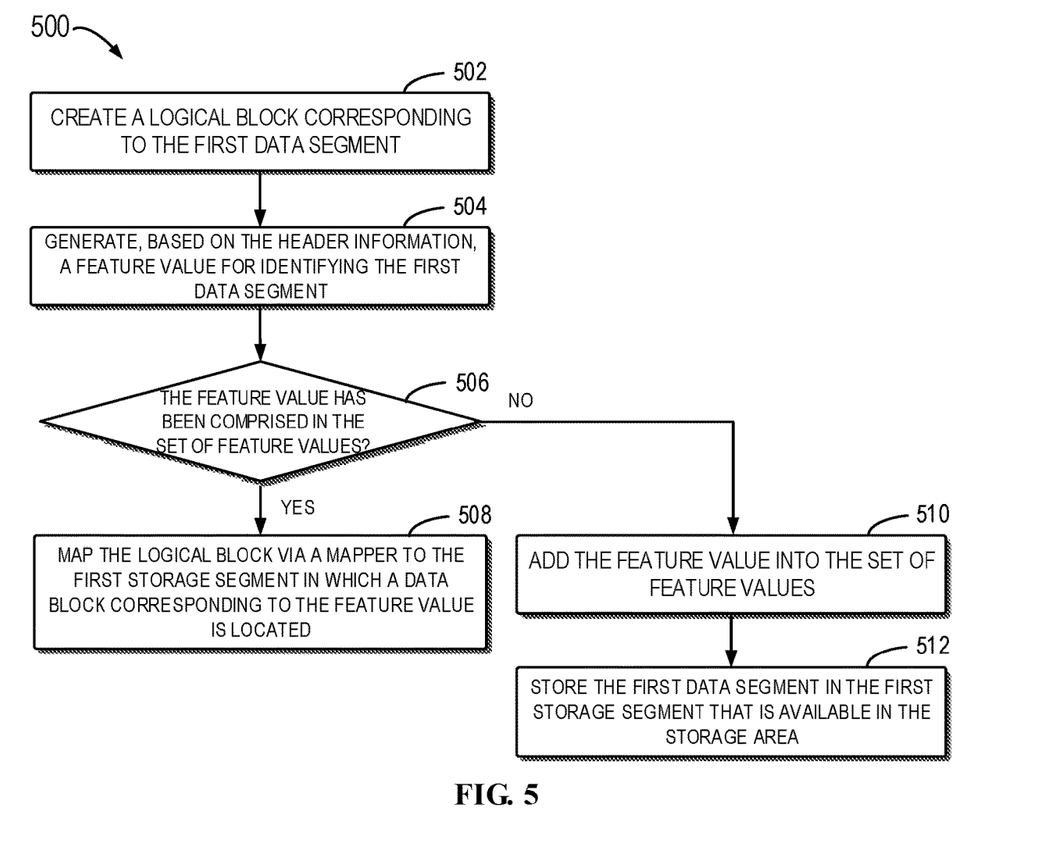
FIG. 5 shows a flowchart of a method of storing a first data segment in a first storage segment through a duplication deduplication operation in accordance with an embodiment of the present disclosure.

To further illustrate a particular implementation of the deduplication operation, FIG. 5 shows a flowchart of a method 500 of storing a first data segment in a first storage segment through a deduplication operation in accordance with an embodiment of the present disclosure. The method 500 is one embodiment of the operations at block 308.

Furthermore, to further illustrate the example steps of the method 500, FIGS. 6A-6D show schematic diagrams of the state changes in logic blocks, storage areas, and set of feature values in the method 500 of FIG. 5 in accordance with an embodiment of the present disclosure. The cache 130, the processor 140', and the storage device 150' in FIGS. 6A-6D are consistent with corresponding components in the system 200 of FIG. 2, and other components in the system 200 are omitted for simplicity. Further, FIGS. 6A-6D further show more details of the cache 130 and the storage device 150' in the system 200.

Figure 6A:
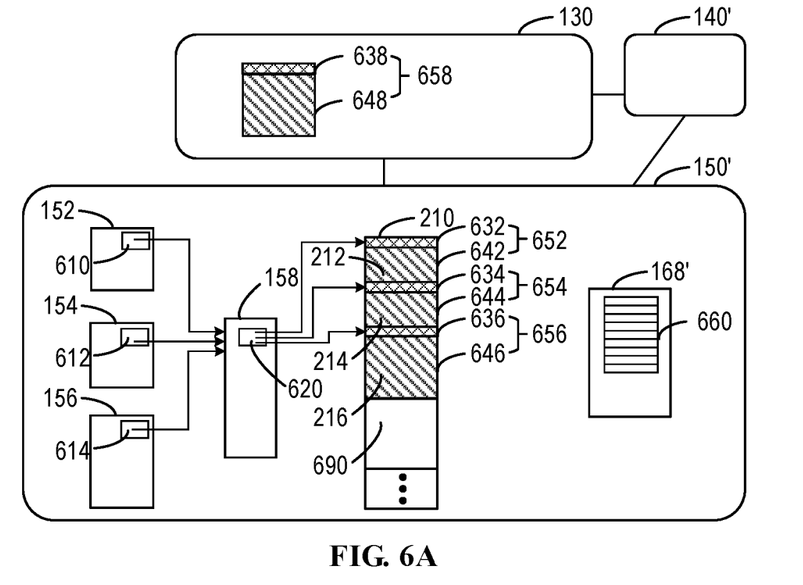
FIGS. 6A-6D show schematic diagrams of the state changes in logic blocks, storage areas, and set of feature values in the method of FIG. 5 in accordance with an embodiment of the present disclosure.

First, FIG. 6A shows an initial state before the method 500 is performed. In the storage device 150', the logic blocks 152, 154, and 156 have been mapped to storage area 210 (specifically, to second storage segments 212 and 214 and first storage segment 216, respectively) via the mapper 158. Also shown in FIG. 6A are the logic blocks 152, 154, and 156 mapped to the mapper 158 using pointers 610, 612, and 614 therein respectively, and further mapped to the storage segments 212, 214 and 216 using pointer 620 in the mapper 158. In some embodiments, the mapper 158 is a virtual node in a mapping relationship. The virtual node includes mapping information, including the starting position and the size of respective storage segments (including the first storage segment and the second storage segment) which the mapper 158 is pointed to.

As can also be seen from FIG. 6A, data segments 652, 654, and 656 corresponding to the logic blocks 152, 154, and 156 have been stored in the storage segments 212, 214, and 216 respectively, wherein the data segments 652 and 654 are second data segments of a second size and the data segment 656 is a first data segment of a first size. The second data segment 652 includes header information 632 and compressed data block 642, the second data segment 654 includes header information 634 and compressed data block 644, and the first data segment 656 includes header information 636 and compressed data block 646. The storage segments 212, 214, and 216 are not available because data has been stored therein. The storage area 210 is also shown to include an available first storage segment 690 of a first size. In addition, the metadata 168' is shown to comprise a set of feature values 660 for data deduplication, and the set of feature values 660 includes different feature values corresponding to different data blocks respectively.

In FIG. 6A, it is also shown that a first data segment 658 of a first size has been generated in the cache 130. The first data segment 658 is comprised of the header information 638 and the data block 648, wherein the data block 648 has been determined by processor 140' as being incompressible.

The method 500 in FIG. 5 begins at block 502 by creating a logical block corresponding to the first data segment. Subsequently, at block 504, a feature value for identifying the first data segment is generated based on the header information.

Figure 6B:
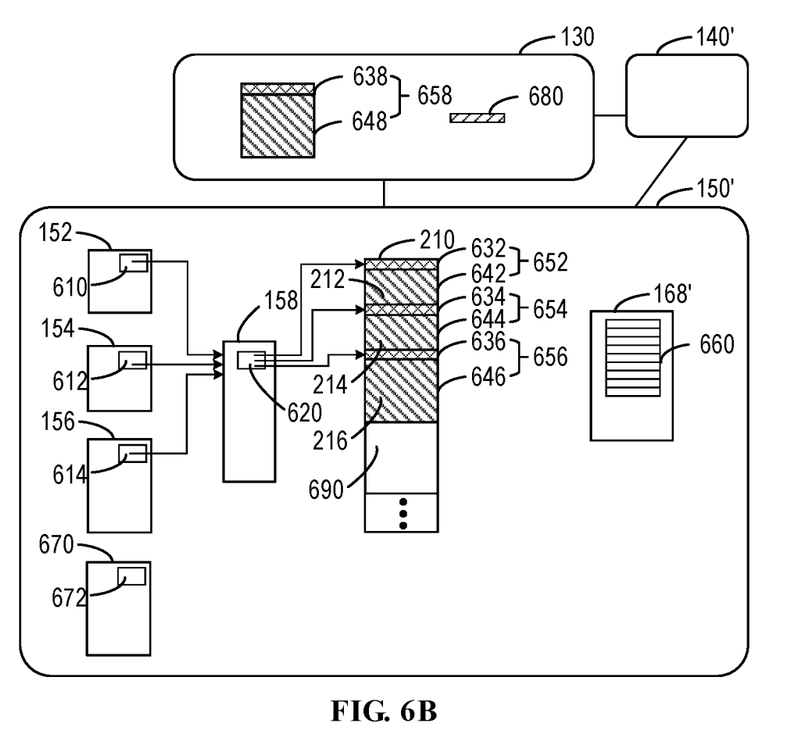

This situation is illustrated in FIG. 6B. In FIG. 6B, a logic block 670 corresponding to the first data block 658 is created, the logic block 670 including a pointer 672 with a null initial value. Further, based on the header information 638, a feature value 680 for identifying the first data segment 658 is generated.

In some embodiments, the processor 140' uses a Secure Hash Algorithm (SHA) to generate the feature value 680 from the header information 638. The feature value generated accordingly corresponds uniquely to the content of the data block, and thus it can be used to identify the data segment.

Subsequently, at block 506 in FIG. 5, the processor 140' determines whether the feature value has been comprised in the set of feature values.

If it is determined at block 506 that the feature value has been comprised in the set of feature values, this indicates that the content of the data block has been stored in the storage device and that the data block does not need to be stored in the available storage segment. In this case, method 500 proceeds to block 508, wherein the logical block is mapped via the mapper to the first storage segment in which the data block corresponding to the feature value is located.

Figure 6C:
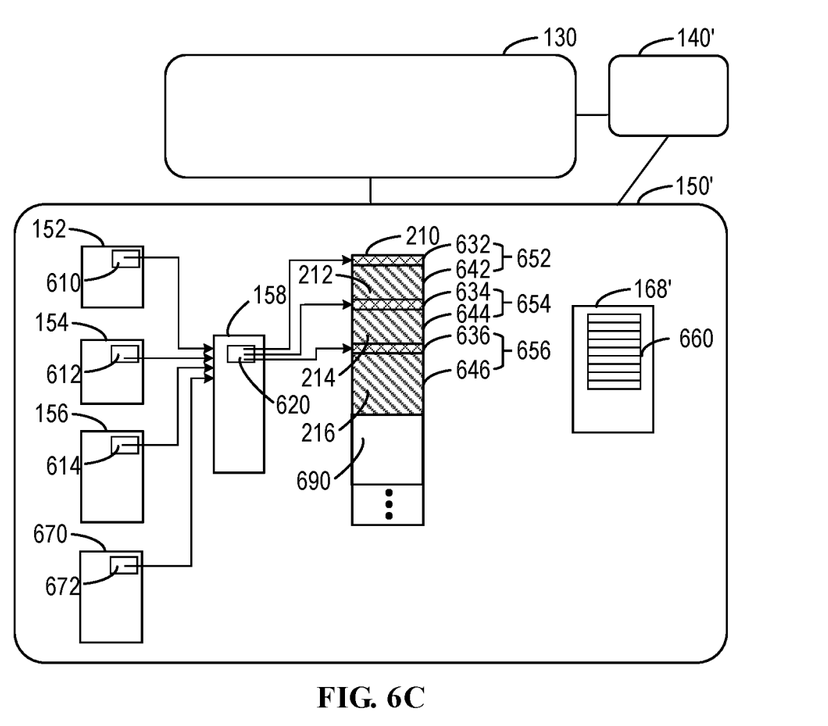

This situation is illustrated in FIG. 6C. In FIG. 6C, it is determined that the feature value 680 generated in FIG. 6B has been comprised in the set of feature values 660, and it is determined that the first storage segment 216 of the storage area 210 stores the data block 646 corresponding to the feature value 680. Thus, the processor 140' maps the logic block 670 via the mapper 158 to the first memory segment 216 in which the data block 646 is located. At this point, both the pointer 672 of the logic block 670 and the pointer 614 of the logic block 156 point to the mapper 158, which indicates that the logic block 670 and the logic block 156 correspond to the same data block. After the storage is completed, the associated storage space in the cache 130 is released.

If it is determined at block 506 in FIG. 5 that the feature value is absent from the set of feature values, this indicates that the contents of the data block have not been stored in the storage device and that this data block needs to be stored in an available storage segment. In this case, the method 500 proceeds to block 510 where a feature value is added into the set of feature values to indicate that the contents of the data block are to be stored in the storage device. Subsequently, at block 512, the first data segment is stored in a first storage segment that is available in the storage area.

Figure 6D:
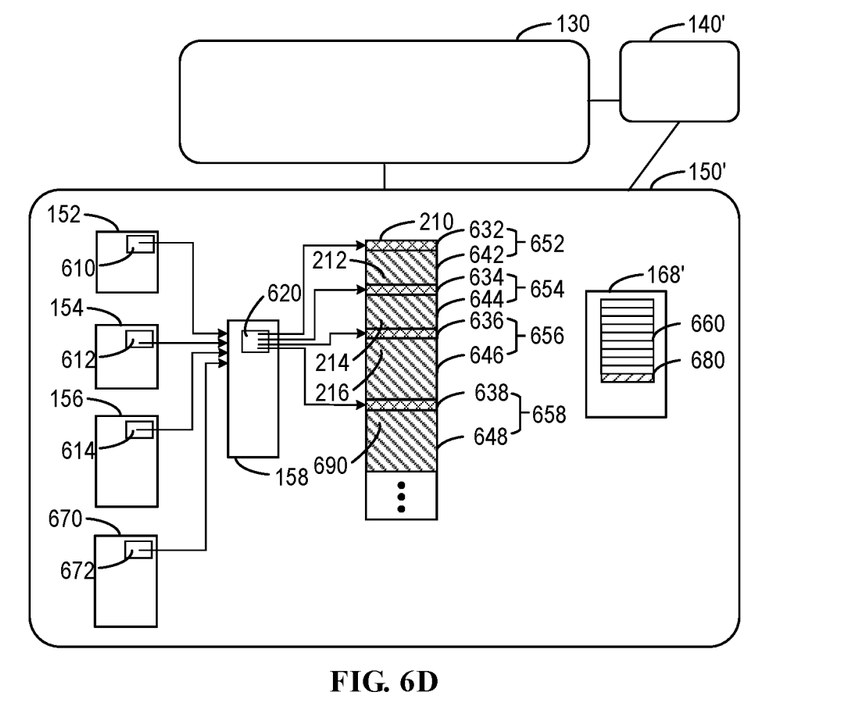

This situation is illustrated in FIG. 6D. In FIG. 6D, it is determined that the feature value 680 generated in FIG. 6B is absent from the set of feature values 660. At this point, the processor 140' adds the feature value 680 into the set of feature values 660, and the first data segment 658 is stored in the first storage segment 690 that is available in the storage area 210. FIG. 6D also shows that the logic block 670 has been mapped to the first memory segment 690 via the mapper 620. After the storage is completed, the associated storage space in the cache 130 is released.

As can be seen from FIGS. 6C and 6D, the deduplication operation ensures that the same data block is only physically stored once in the storage device. In the case where a latter write request relates to an already stored data block, the deduplication operation simply updates the mapping relationship of the logical block to the storage area without storing the data block repeatedly.

In some embodiments, the logic blocks 152, 154, 156, and 670 in FIGS. 6A-6D can be mapped to different storage areas via different mappers.

In summary, the method 500 of FIG. 5 achieves storing the first data segment in the first storage segment through a deduplication operation.

Returning to FIG. 3, when it is determined at block 304 that the data block is compressible, the method 300 can perform various operations, one of which will be described below with reference to FIGS. 7 and 8.

Figure 7:
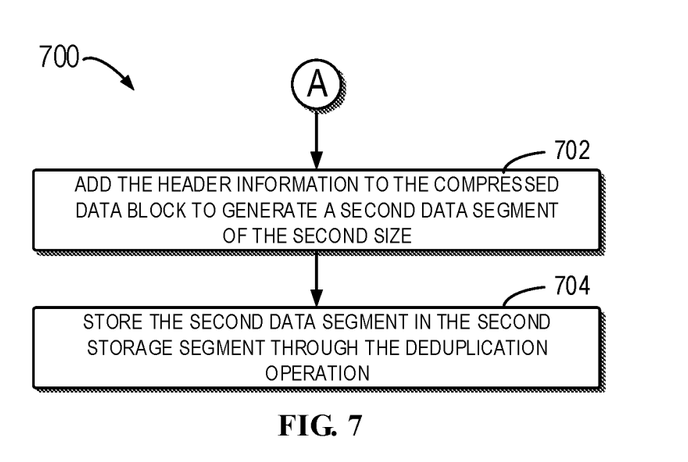
FIG. 7 shows a method for data deduplication when it is determined that a data block is compressible according to an embodiment of the present disclosure.

FIG. 7 shows a method 700 for data deduplication when it is determined that a data block is compressible according to an embodiment of the present disclosure.

The method 700 begins at block 702. At block 702, the processor 140' adds header information to the data block to generate a second data segment of the second size. A second data segment is generated for subsequent storage through the deduplication operation in the available second storage segment. In some embodiments, the header information is the metadata for identifying the length, the storage location, and the uniqueness of the data of the data block, and the like. In some embodiments, the feature value used to identify the second data segment can be generated based on the header information of the second data segment.

Subsequently, at block 704, the second data segment is stored in the second storage segment through a deduplication operation. Thereby, the deduplication operation on the compressed data block is achieved.

Figure 8:
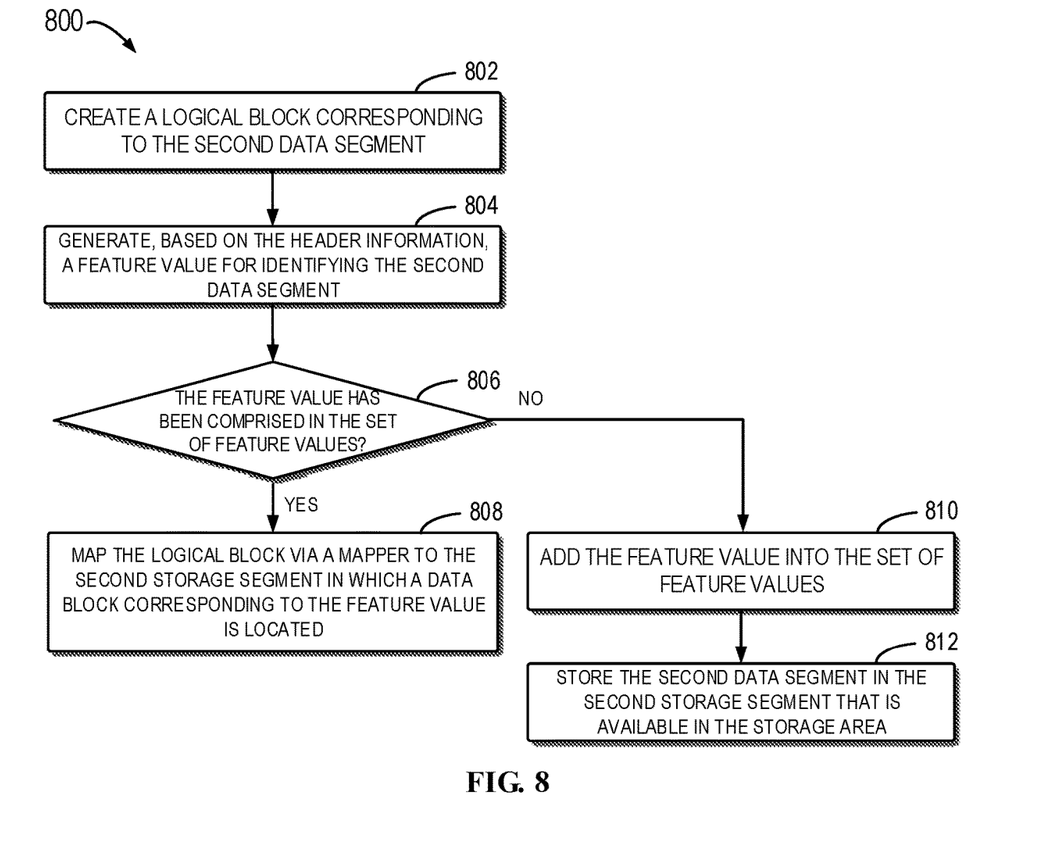
FIG. 8 shows a flowchart illustrating a method of storing a second data segment in a second storage segment through a deduplication operation according to an embodiment of the present disclosure.

Turning to FIG. 8, FIG. 8 shows a flowchart of a method 800 of storing a second data segment in a second storage segment through a deduplication operation according to an embodiment of the present disclosure. The method 800 is one embodiment of the operations at block 704. The method 800 employs a similar principle to the method 500 shown in FIG. 5, so the steps of the method 800 are only briefly described herein.

The method 800 begins at block 802 with creating a logical block corresponding to a second data segment. Subsequently, at block 804, a feature value for identifying the second data segment is generated based on the header information.

In some embodiments, the processor 140' uses SHA to generate the feature value from the header information. The feature value generated accordingly corresponds uniquely to the contents of the compressed data block, and thus it can be used to identify the second data segment.

Subsequently, at block 806, the processor 140' determines whether the feature value has been comprised in the set of feature values. If it is determined at block 806 that the feature value has been comprised in the set of feature values, the method 800 proceeds to block 808 where the logical block is mapped via the mapper to the second storage segment in which the data block corresponding to the feature value is located. If it is determined at block 806 that the feature value is absent from the set of feature values, the method 800 proceeds to block 810 where the feature value is added into the set of feature values. Subsequently, at block 812, the second data segment is stored in a second storage segment that is available in the storage area.

In summary, the method 800 achieves storing the second data segment in the second storage segment through a deduplication operation.

Returning to FIG. 3, where it is determined at block 304 that the data block is compressible, the method 300 can perform other operations in addition to proceeding to the method 700 described in FIG. 7. As an example, padding information may be further added to the compressed data block in addition to adding the header information to the compressed data block, in order to generate a data segment of the second size or other desirable size. In this example, padding information is used to align the data segment to the corresponding storage area.

Thus, the method 300 for data deduplication in accordance with an embodiment of the present disclosure has been described.

In some embodiments, the method 300 further includes allocating a new storage area in the storage device in response to determining that all first storage segments in the storage area are unavailable. In some embodiments, the method 300 further includes allocating a new storage area in the storage device in response to determining that all second storage segments in the storage area are unavailable.

By the improved scheme for data deduplication of the present disclosure, data deduplication operation is performed for both compressible data and incompressible data, thereby increasing the flexibility and efficiency of data deduplication is increased. In addition, the scheme of the present disclosure effectively saves storage space compared to the conventional data deduplication scheme, and in particular, effectively saves storage space when there is a large amount of incompressible data. Furthermore, the solution of the present disclosure does not affect processing performance compared to conventional data deduplication schemes.

Figure 9:
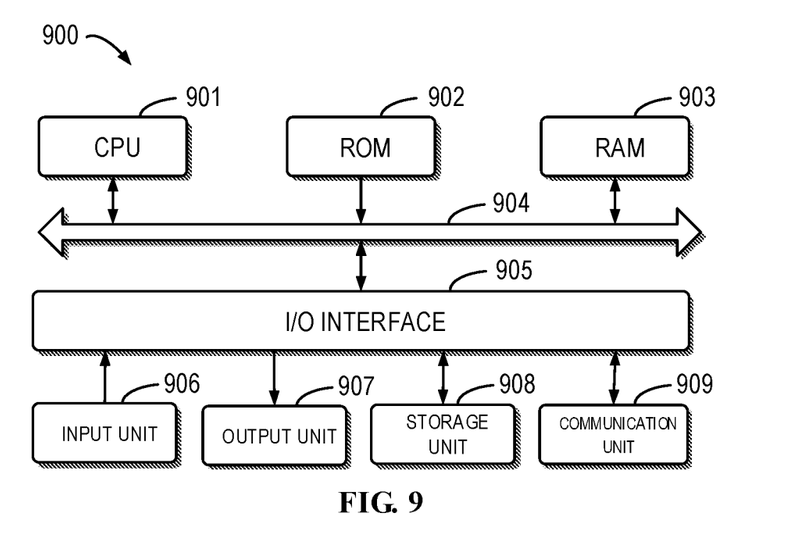
FIG. 9 shows a schematic block diagram of an example device adapted to implement embodiments of the present disclosure.

FIG. 9 illustrates a schematic block diagram of an example device 900 adapted to implement embodiments of the present disclosure. For example, the processor 140' in the system 200 as shown in FIG. 2 can be implemented by the device 900. As shown in FIG. 9, the device 900 includes a central processing unit (CPU) 901 that may perform various appropriate actions and processing based on computer program instructions stored in a read-only memory (ROM) 902 or computer program instructions loaded from a storage section 908 to a random access memory (RAM) 903. In the RAM 903, there further store various programs and data needed for operations of the device 900. The CPU 901, the ROM 902 and the RAM 903 are connected to each other via a bus 904. An input/output (I/O) interface 905 is also connected to the bus 904.

The following components in the device 900 are connected to the I/O interface 905 including: an input 906, such as a keyboard, a mouse and the like; an output unit 907 including various kinds of displays and a loudspeaker, etc.; a memory unit 908 including a magnetic disk, an optical disk, etc.; a communication unit 909 including a network card, a modem, and a wireless communication transceiver, etc. The communication unit 909 allows the device 900 to exchange information/data with other devices through a computer network such as the Internet and/or various kinds of telecommunications networks.

Various processes and processing described above, e.g., the method 300, the method 400, the method 500, the method 700 and/or the method 800, may be executed by the processing unit 901. For example, in some embodiments the method 300, the method 400, the method 500, the method 700 and/or the method 800 may be implemented as a computer software program that is tangibly embodied on a machine readable medium, e.g., the storage unit 908. In some embodiments, part or all of the computer programs may be loaded and/or mounted onto the device 900 via the ROM 902 and/or the communication unit 909. When the computer program is loaded to the RAM 903 and executed by the CPU 901, one or more steps of the method 300, the method 400, the method 500, the method 700 and/or the method 800 as described above may be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for data deduplication, comprising:
    receiving a first write request;
    in response to receiving the first write request, determining that a first data block to which the first write request is related is incompressible, the first data block having a predetermined block size;
    in response to determining that the first data block is incompressible, adding first header information to the incompressible first data block to generate a first data segment having a first size greater than the predetermined block size, wherein a first storage segment has been allocated in a storage area of a storage device, the first storage segment having the first size greater than the predetermined block size; and
    performing a first deduplication operation for the incompressible first data block, the performing the first deduplication operation comprising:
        creating a first logical block corresponding to the first data segment;
        identifying, by the first header information, a uniqueness of the incompressible first data block, wherein the identifying the uniqueness of the incompressible first data block includes generating a first feature value from the first header information, the first feature value being a first hash value, the first header information being metadata identifying a length of the incompressible first data block, a storage location of the incompressible first data block, and the uniqueness of the incompressible first data block;
        determining whether or not a set of feature values includes the first feature value, the set of feature values including different feature values for different data blocks;
        in response to determining that the set of feature values includes the first feature value, mapping, by a mapper, the first logical block to the first storage segment in which the incompressible first data block has previously been stored; and
        in response to determining that the set of feature values does not include the first feature value, adding the first feature value into the set of feature values, storing the incompressible first data block in the first storage segment, and mapping, by the mapper, the first logical block to the first storage segment.

2. The method of claim 1 further comprising:
    receiving a second write request;
    in response to receiving the second write request, determining that a second data block to which the second write request is related is compressible, the second data block having the predetermined block size;
    in response to determining that the second data block is compressible:
        compressing the second data block; and
        adding second header information to the compressed second data block to generate a second data segment having a second size smaller than the first size of the first data segment, wherein a second storage segment has been allocated in the storage area of the storage device, the second storage segment having the second size; and
    performing a second deduplication operation for the compressed second data block.

3. The method of claim 2, wherein the performing the second deduplication operation comprises:
    creating a second logical block corresponding to the second data segment;
    identifying, by the second header information, a uniqueness of the compressed second data block, wherein the identifying the uniqueness of the compressed second data block includes generating a second feature value from the second header information, the second feature value being a second hash value, the second header information being metadata identifying a length of the compressed second data block, a storage location of the compressed second data block, and the uniqueness of the compressed second data block;
determining whether or not the set of feature values includes the second feature value;
in response to determining that the set of feature values includes the second feature value, mapping, by the mapper, the second logical block to the second storage segment in which the compressed second data block has previously been stored; and
in response to determining that the set of feature values does not include the second feature value, adding the second feature value into the set of feature values, storing the compressed second data block in the second storage segment, and mapping, by the mapper, the second logical block to the second storage segment.

4. The method of claim 2, further comprising:
in further response to determining that the second data block is compressible, adding padding information to the compressed second data block to generate the second data segment of the second size.

5. The method of claim 1, wherein determining whether the first data block is compressible or incompressible comprises:
compressing the first data block;
determining a compression ratio of the compressing of the first data block;
determining that the compression ratio is greater than a threshold; and
in response to determining that the compression ratio is greater than the threshold, determining that the first data block is incompressible.

6. An electronic device, comprising:
one or more processors; and
a storage device for storing one or more programs, the one or more programs, when executed by the one or more processors, causing the one or more processors to perform acts comprising:
receiving a write request;
in response to receiving the write request, determining that a data block to which the write request is related is incompressible, the data block having a predetermined block size;
in response to determining that the data block is incompressible, adding header information to the incompressible data block to generate a first data segment having a first size greater than the predetermined block size, wherein a first storage segment has been allocated in a storage area of a storage device, the first storage segment having the first size greater than the predetermined block size; and
performing a first deduplication operation for the incompressible first data block, the performing the first deduplication operation comprising:
creating a first logical block corresponding to the first data segment;
identifying, by the first header information, a uniqueness of the incompressible first data block, wherein the identifying the uniqueness of the incompressible first data block includes generating a first feature value from the first header information, the first feature value being a first hash value, the first header information being metadata identifying a length of the incompressible first data block, a storage location of the incompressible first data block, and the uniqueness of the incompressible first data block;
determining whether or not a set of feature values includes the first feature value, the set of feature values including different feature values for different data blocks;
in response to determining that the set of feature values includes the first feature value, mapping, by a mapper, the first logical block to the first storage segment in which the incompressible first data block has previously been a stored; and
in response to determining that the set of feature values does not include the first feature value, adding the first feature value into the set of feature values, storing the incom pressible first data block in the first storage segment, and mapping, by the mapper, the first logical block to the first storage segment.

7. The device of claim 6, wherein the acts further comprise:
receiving a second write request;
in response to receiving the second write request, determining that a second data block to which the second write request is related is compressible, the second data block having the predetermined block size;
in response to determining that the second data block is compressible:
compressing the second data block; and
adding second header information to the compressed data block to generate a second data segment having a second size smaller than the first size of the first data segment, wherein a second storage segment has been allocated in the storage area of the storage device, the second storage segment having the second size; and
performing a second deduplication operation for the compressed second data block.

8. The device of claim 7, wherein the performing the second deduplication operation comprises:
creating a second logical block corresponding to the second data segment;
identifying, by the second header information, a uniqueness of the compressed second data block, wherein the identifying the uniqueness of the compressed second data block includes generating a second feature value from the second header information, the second feature value being a second hash value, the second header information being metadata identifying a length of the compressed second data block, a storage location of the compressed second data block, and the uniqueness of the compressed second data block;
determining whether or not the set of feature values includes the second feature value;
in response to determining that the set of feature values includes the second feature value, mapping, by the mapper, the second logical block to the second storage segment in which the compressed second data block has previously been stored; and
in response to determining that the set of feature values does not include the second feature value, adding the second feature value into the set of feature values, storing the compressed second data block in the second storage segment, and mapping, by the mapper, the second logical block to the second storage segment.

9. The device of claim 7, wherein the acts further comprise: determining that all storage segments in the storage area are unavailable; and in response to determining that all storage segments in the storage area are unavailable, allocating a new storage area in the storage device.

10. The device of claim 6, wherein determining whether the data block is compressible comprises:
    compressing the data block;
    determining a compression ratio of the compressing of the first data block;
    determining that the compression ratio is greater than a threshold; and
    in response to determining that the compression ratio is greater than the threshold, determining that the data block is incompressible.

11. A computer program product having a non-transitory computer readable medium which stores a set of instructions to perform data deduplication, the set of instructions, when carried out by computerized circuitry, causing the computerized circuitry to perform a method of:
    receiving a write request;
    in response to receiving the write request, determining that a data block to which the write request is related is incompressible, the data block having a predetermined block size;
    in response to determining that the data block is incompressible, adding header information to the incompressible data block to generate a data segment having a size greater than the predetermined block size, wherein a storage segment has been allocated in a storage area of a storage device, the storage segment having the size greater than the predetermined block size; and
    performing a deduplication operation for the incompressible data block, the performing the deduplication operation comprising:
        creating a logical block corresponding to the data segment;
        identifying, by the header information, a uniqueness of the incompressible data block, wherein the identifying the uniqueness of the incompressible data block includes generating a feature value from the header information, the feature value being a hash value, the header information being metadata identifying a length of the incompressible data block, a storage location of the incompressible data block, and the uniqueness of the incompressible data block;
        determining whether or not a set of feature values includes the feature value, the set of feature values including different feature values for different data blocks;
        in response to determining that the set of feature values includes the feature value, mapping, by a mapper, the logical block to the storage segment in which the incompressible data block has previously been stored; and
        in response to determining that the set of feature values does not include the feature value, adding the feature value into the set of feature values, storing the incompressible data block in the storage segment, and mapping, by the mapper, the logical block to the storage segment.

* * * * *